Oct. 30, 1956 D. X. KLEIN ET AL 2,768,872
MANUFACTURE OF URANIUM TETRAFLUORIDE
Filed Dec. 13, 1945
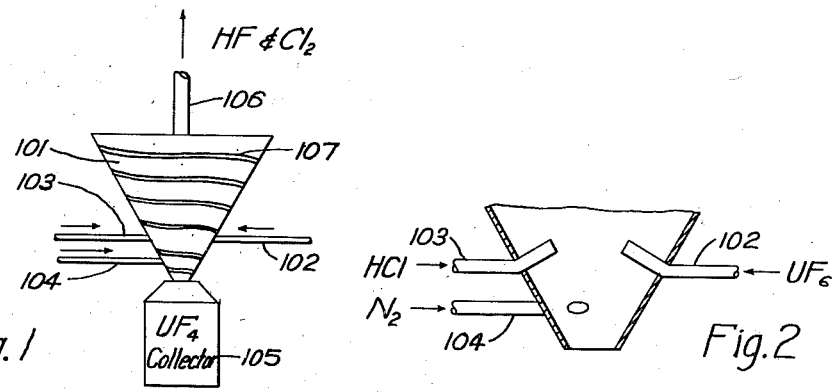
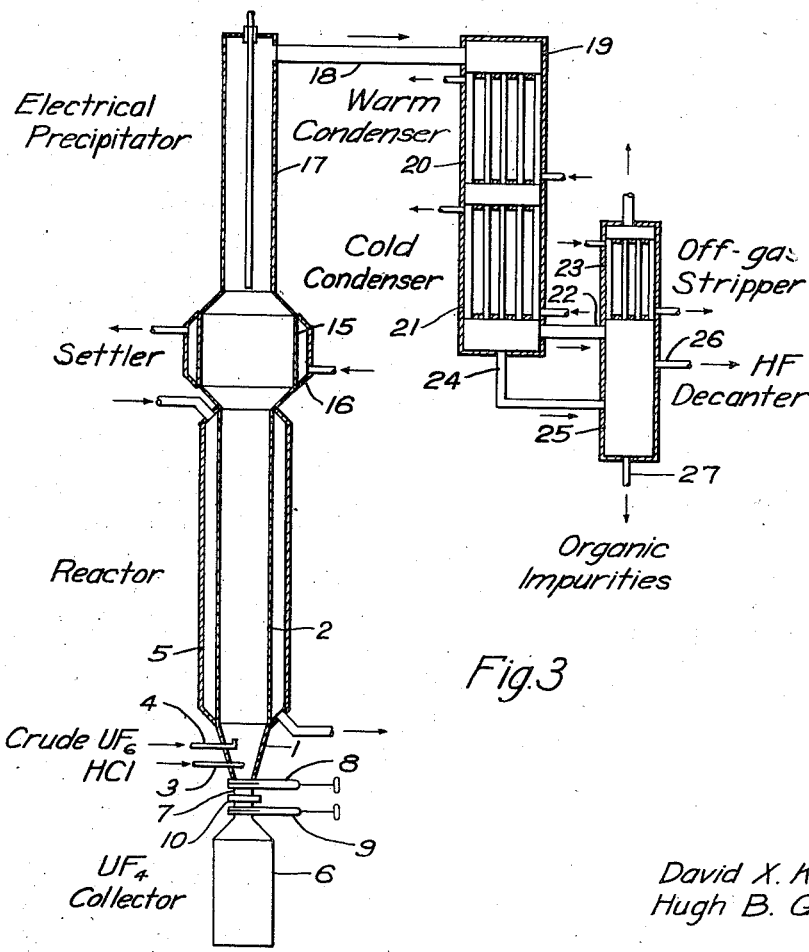
Inventor
David X. Klein
Hugh B. Gage

United States Patent Office 2,768,872
Patented Oct. 30, 1956

2,768,872

MANUFACTURE OF URANIUM TETRAFLUORIDE

David X. Klein, Wilmington, and Hugh B. Gage, Edge Moor Terrace, Del., assignors to the United States of America as represented by the United States Atomic Energy Commission Application December 13, 1945, Serial No. 634,869

6 Claims. (Cl. 23—14.5)

This invention relates to the manufacture of uranium tetrafluoride and is particularly concerned with the conversion of uranium hexafluoride to uranium tetrafluoride by reaction in vapor phase with hydrogen chloride.

The vapor phase reaction of hydrogen chloride with uranium hexafluoride proceeds readily at temperatures between 200° and 400° C. with the formation of solid uranium tetrafluoride, hydrogen fluoride vapor, and chlorine gas according to the equation,

$$UF_6 + 2HCl \rightarrow UF_4 + 2HF + Cl_2$$

Solid uranium tetrafluoride is useful for the manufacture of metallic uranium but for this purpose it should have a relatively high bulk density. The reduction of uranium tetrafluoride may be carried out satisfactorily with material having a bulk density of about 1.5 grams or more per cubic centimeter.

The vapor phase reaction of uranium hexafluoride and hydrogen chloride leads to the formation of a uranium tetrafluoride product having a bulk density relatively low compared to that produced by the reaction of solid uranium dioxide and gaseous hydrogen fluoride. Thus bulk densities in the neighborhood of one and sometimes substantially lower have been obtained.

It is an object of the present invention to modify the vapor phase reaction of uranium hexafluoride and hydrogen chloride to produce directly uranium tetrafluoride in a form sufficiently dense for use in metallurgical operations for conversion to uranium metal. A further object of the invention is to provide an apparatus suitable for carrying out the reaction of uranium hexafluoride with hydrogen chloride to produce dense uranium tetrafluoride directly. A still further object is to effect the desired conversion continuously and to avoid the necessity of interrupting operations for removal of the product or frequent cleaning of the apparatus. Further objects will appear from the following description of the invention and detailed examples of its operation.

In accordance with the present invention uranium hexafluoride is reacted with hydrogen chloride in vapor phase in a reaction zone up through which gases pass at a sufficient rate to prevent settling of the finer uranium tetrafluoride reaction product and to hold the fine particles in the reaction zone while they undergo substantial particle growth.

By this procedure it has been found that the average particle size of the uranium tetrafluoride product may be increased from about two microns to between six and eight microns. The bulk density of the product is at the same time increased from the neighborhood of one to about 1.9 grams per cubic centimeter. In general it is possible by proper control of the gas flow to provide products having bulk densities between 1.6 and 2.0 without further treatment of the product.

The suspension of the reaction product in the reaction zone is controlled by regulating the velocity and proportions of the gases passing through the system to provide a highly turbulent condition in the lower section of the chamber so as to prevent fine particles from settling out of the gases. It has been found advantageous to provide substantially more gas in the reaction zone than provided by the stoichiometric proportions of the reactants. The volume of excess gas may be equal to or greater than that of the gases which react. The additional gas may be supplied by introducing about 3 or 4 times the stoichiometric quantity (6 to 8 molecular proportions) of hydrogen chloride. Similar results may be obtained by using an inert gas or vapor, for example, nitrogen. The additional gas is introduced not merely to serve as a diluent but to provide an increased turbulence in or immediately below the reaction zone and to promote suspension of the finer particles of solid mterial.

In use of the process for conversion of uranium hexafluoride contaminated with substantial proportions of volatile impurities the impurities may help to supply the desired proportions of gaseous diluent. Thus uranium hexafluoride containing 10% to 40% by weight of perfluoro-dimethyl-cyclohexane yields a weight of organic vapor from about equal the weight of hydrogen fluoride formed to four times this amount. In some cases, the volatile impurities may be present in sufficient amount to supply all of the excess gas required for optimum operating conditions. The volatile impurity may be condensed along with the hydrogen fluoride or a fractional condensation may be effected.

One form of apparatus suitable for carrying out the process comprises a reaction chamber formed like an inverted cone having reaction gas inlets near the bottom, at least one being disposed tangentially. The spiral motion imparted to the gases by tangential inlets causes solid particles to drift toward the circumference of the cone. In the higher regions the gas flows at lower velocity and solid particles settle out, falling back into the turbulent gases near the bottom of the cone. Large, heavy particles continue to fall through this zone and are collected below while fine particles are picked up by the gases and recirculated toward the top of the chamber. This recirculation continues until the fine particles have grown to such a size that they can fall through the turbulent zone. The fine particles should recirculate into the zone of first mixing of uranium hexafluoride vapor and hydrogen chloride in order that the reaction of these materials may take place in contact with the fine particles and thereby promote growth by accretion. Tangential introduction of at least one of the gases at sufficiently high velocity to scour the wall of the chamber free of the fine particles falling into its path facilitates this.

The removal of fine dust from the gases may be facilitated by the provision of a settling chamber or another type of dust separator above the reaction zone. An electrical precipitator has been found to be particularly efficient in removing the fine dust particles which it is desired to return to the reaction zone for additional growth. The precipitator may be preceded by a settling chamber or an enlargement of the reaction chamber in order to reduce the quantity of dust to be handled by the precipitator.

In the accompanying drawing

Figure 1 shows diagrammatically in elevation an apparatus embodying the invention;

Figure 2 is an enlarged fragmentary section through the vertical axis of the apparatus shown in Figure 1; and Figure 3 shows diagrammatically an alternative form of reactor connected with recovery equipment for collecting condensable constituents from the reaction vapors.

With particular reference to Figures 1 and 2 of the drawing, the numeral 101 designates a reactor in the form of an inverted cone. The reactor is provided with upwardly directed inlets for uranium hexafluoride and hydrogen chloride 102 and 103, respectively. Below these inlets a tangential gas inlet 104 for nitrogen or other inert gas is provided. The bottom of the conical reactor 101 is open and is located over a collector 105 for uranium tetrafluoride. A gas outlet 106 leads from the top of the reactor 101 to suitable recovery apparatus for recovering constituents of the gaseous product. The reactor 101 is wrapped with an electrical heating element 107 for maintaining the reactor at the proper reaction temperature.

In operating this apparatus, uranium hexafluoride and hydrogen chloride are introduced through inlets 102 and 103 in approximately stoichiometric proportions and an inert gas, such as nitrogen or excess hydrogen chloride, is introduced at 104. The rates of introduction of the gases are controlled so as to provide a substantial buoying effect for the solid uranium tetrafluoride product. The most satisfactory velocities will depend in each case to a considerable extent upon the design of the apparatus.

The apparatus illustrated in Figure 3 is designed for the large scale application of the invention. The reactor comprises a conical mixing section 1 and a reaction and segregation section 2. A hydrogen chloride inlet 3 leads into section 1 at a point near the bottom. This inlet is arranged tangentially to provide spiral flow of gas through both sections of the reactor. Slightly above the inlet 3 an eccentric inlet 4 for uranium hexafluoride is provided. This inlet is directed upwardly to introduce the uranium hexafluoride in a direction parallel to the axis of the reactor. The reactor is provided with a jacket 5 or other temperature control means for maintaining the temperature of the gases within the reactor. The bottom of section 1 opens into one or more uranium tetrafluoride collectors. The apparatus is illustrated with uranium tetrafluoride collector 6 connected by conduit 7, valves 8 and 9 and coupling 10 so that the collector can be changed while the apparatus is operating. Mounted directly above section 2 is a settling chamber 15 which is essentially an enlargement of the cylindrical chamber. This settling chamber also may be provided with heat control means such as jacket 16. Electrical precipitator 17 is mounted directly above the settling chamber. The reactor, settler, and precipitator are so arranged as to provide a minimum of obstruction to the free fall of dust in the apparatus. The solid product has a pronounced tendency to pack and hence all openings through which it passes should be large and walls preferably should be steeply inclined or vertical.

From precipitator 17, conduit 18 leads to condenser 19 having a warm section 20 and a cold section 21. The warm section 20 is supplied with cooling water to effect a preliminary cooling of the gases and partial condensation of vapors. The cold condenser section 21 is cooled by refrigerated brine to a temperature sufficiently low to remove substantially all of the hydrogen fluoride vapor. Gas conduit 22 leads from condenser section 21 to an off-gas stripper 23 for stripping any residual hydrogen fluoride vapor from the effluent gases. Liquid condensate line 24 connects the bottom of the cold section 21 wtih decanter 25. The decanter opens into stripper 23 to permit any occluded gases to escape and has an outlet 26 for hydrogen fluoride at the top and an outlet 27 for organic impurities at the bottom.

The following examples further illustrate the invention.

*Example 1*

The reactor was similar to that illustrated in Figures 1 and 2 of the drawing. The reaction chamber comprised an inverted nickel cone approximately 15 inches tall having a 1-inch outlet at the bottom for solid reaction product. The gas inlet tubes were ¼-inch copper tubes and the mouths of the hydrogen chloride and uranium hexafluoride tubes were approximately 1¼ inches apart.

Nitrogen was introduced through tube 104 at a rate of 2.65 grams per minute. Uranium hexafluoride was introduced through tube 102 at a rate of 4.45 grams per minute and hydrogen chloride was introduced through tube 103 at a rate of 2.7 grams per minute. The reaction temperature was measured by a pair of thermocouples located approximately one-third and one-half the vertical distance from the bottom of the reaction chamber. During the reaction the temperatures registered by the lower thermocouple varied between 225° and 292° C. and those indicated by the upper thermocouple varied between 164° and 194° C. The particle size of the solid uranium tetrafluoride recovered in this run was principally from 4 to 8 microns. The bulk density of this product was 1.9 grams per cubic centimeter.

*Example 2*

Into an apparatus identical with that employed in Example 1, hydrogen chloride at a rate of 2.5 grams per minute and uranium hexafluoride at a rate of 8.1 grams per minute, corresponding to a molecular ratio of hydrogen chloride to uranium hexafluoride of 3.35, and nitrogen at a rate of about 4 grams per minute were introduced. The temperature at the lower thermocouple was maintained at about 250–260° C. and the temperature at the upper thermocouple at about 190–200° C. The uranium tetrafluoride product consisted mainly of particles varying from 6 to 12 microns in diameter and was mostly 8-micron particles. The bulk density of the material was 1.98.

*Example 3*

This example was carried out in apparatus similar to that illustrated in Figure 3 of the drawing except that the gas inlets were arranged as shown in Figures 1 and 2. The reactor was about six inches in diameter and about 6 feet tall. Hydrogen chloride was introduced at a rate of about 620 grams per minute and uranium hexafluoride was introduced at a rate of about 1760 grams per minute, a mol ratio of 3.32. Nitrogen was introduced at a rate of 550 grams per minute. During the run the temperature, measured about 18 inches above the inlets, varied from 220° to 299° C. The solid uranium tetrafluoride product was composed of particles of widely variant diameters from about 1 to 80 microns, most of the particles having diameters between 4 and 5 microns. The bulk density of the product was 1.9 grams per cubic centimeter.

*Example 4*

The apparatus used in this example was similar to that used in Example 3 except that the inlets were arranged as illustrated in Figure 3 of the drawing.

Hydrogen chloride was introduced at the rate of 300 grams per minute and uranium hexafluoride at the rate of about 730 grams per minute, corresponding to a molecular ratio of 4.0. The temperature in the main reaction zone varied between 270° and 356° C. during the run. The uranium tetrafluoride product had a density of approximately 1.8 grams per cubic centimeter.

*Example 5*

The apparatus used in this example was like that used in Example 4.

Hydrogen chloride was introduced at the rate of 275 grams per minute and uranium hexafluoride was introduced at the rate of 675 grams per minute, corresponding to a molecular ratio of 4.08. The temperature in the main reaction zone varied from 114° to 348° C. during the run. The bulk density of the product was 1.62 grams per cubic centimeter.

*Example 6*

This example was carried out using the same apparatus as employed in the preceding example.

Hydrogen chloride was introduced at the rate of about 250 grams per minute and uranium hexafluoride at the rate of about 740 grams per minute, corresponding to a ratio of 2.82 mols of hydrogen chloride for each mol of uranium hexafluoride. During the reaction the temperature in the main reaction zone varied from 141° to 338° C. The product had a bulk density of 1.9 grams per cubic centimeter.

It will be understood that we intend to include variations and modifications of the invention and that the preceding examples are illustrations only and in no wise to be construed as limitation upon the invention, the scope of which is defined in the appended claims, wherein we claim:

1. In the manufacture of uranium tetrafluoride from uranium hexafluoride by reaction with hydrogen chloride in vapor phase, the improvement which comprises introducing uranium hexafluoride vapor and hydrogen chloride vapor into an inverted conical reaction chamber tangentially near the bottom thereof so as to create a zone of relatively high velocity and high gas turbulence near the bottom, withdrawing gaseous reaction products of relatively low velocity and turbulence at the top of said reaction chamber, and withdrawing solid uranium tetrafluoride particles from the bottom of said reaction chamber.

2. In the manufacture of uranium tetrafluoride from uranium hexafluoride by reaction with hydrogen chloride in vapor phase, the improvement which comprises introducing uranium hexafluoride vapor and hydrogen chloride vapor into a reaction chamber of gradually increasing cross-section tangentially near the bottom thereof so as to create a zone of relatively high velocity and high gas turbulence near the bottom, withdrawing gaseous reaction products of relatively low velocity and turbulence at the top of said reaction chamber, and withdrawing solid uranium tetrafluoride particles from the bottom of said reaction chamber.

3. The process of claim 2 wherein a volume of excess gas at least equal to the volume of reactant gases is introduced into the zone of high turbulence.

4. In the manufacture of uranium tetrafluoride from uranium hexafluoride by the vapor phase reaction with hydrogen chloride, the improvement which comprises introducing uranium hexafluoride vapor and hydrogen chloride vapor into a lower portion of a reaction zone of a chamber so as to create a high gas velocity and turbulence, passing gaseous reaction products from said zone to an upper zone of said chamber having a greater cross-section than said reaction zone to provide a relatively low gas velocity and turbulence so as to create settling of solid uranium tetrafluoride therein, withdrawing gaseous reaction products from the top of said upper zone, and withdrawing solid uranium tetrafluoride particles from the bottom of said reaction zone.

5. The process of claim 4 wherein the reaction chamber is maintained at a temperature between 200 and 400° C.

6. In the manufacture of uranium tetrafluoride from uranium hexafluoride by reaction with hydrogen chloride in vapor phase, the improvement which comprises introducing uranium hexafluoride vapor and hydrogen chloride vapor into an inverted conical reaction chamber near the bottom thereof, at least one of said vapors being introduced tangentially into the reaction chamber so as to create a zone of relatively high velocity and high gas turbulence near the bottom, withdrawing gaseous reaction products of relatively low velocity and turbulence at the top of said reaction chamber, and withdrawing solid uranium tetrafluoride particles from the bottom of said reaction chamber.

References Cited in the file of this patent

UNITED STATES PATENTS

| 480,028 | Nation | Aug. 2, 1892 |
| 1,355,105 | Canon | Oct. 5, 1920 |
| 2,270,498 | Bozarth | Jan. 20, 1942 |
| 2,410,043 | Breton et al. | Oct. 29, 1946 |

FOREIGN PATENTS

| 513,947 | Great Britain | Oct. 26, 1939 |